United States Patent [19]

Paglia

[11] 4,078,241
[45] Mar. 7, 1978

[54] FILM-ENGAGING PHOTOGRAPHIC MECHANISM FOR SELF-DEVELOPING FILM

[75] Inventor: Richard Paglia, Carlisle, Mass.

[73] Assignee: Polaroid Corporation, Cambridge, Mass.

[21] Appl. No.: 721,855

[22] Filed: Sep. 9, 1976

[51] Int. Cl.² .................... G03B 15/52; G03B 17/26
[52] U.S. Cl. ...................................... 354/86; 354/276
[58] Field of Search .................. 354/83, 84, 85, 86, 354/275, 276

[56] References Cited

U.S. PATENT DOCUMENTS

| | | | |
|---|---|---|---|
| 3,779,770 | 12/1973 | Alston et al. | 354/86 X |
| 3,974,510 | 8/1976 | Ivester | 354/86 |
| 3,994,006 | 11/1976 | Ichii | 354/85 X |
| 4,023,191 | 5/1977 | Augustin, Jr. et al. | 354/86 |

Primary Examiner—Edna M. O'Connor
Attorney, Agent, or Firm—David R. Thornton

[57] ABSTRACT

A film-engaging mechanism for incorporation in a camera which uses self-developing film has a receptacle for a film cassette and a processor for developing the film. The receptacle houses a replaceable film cassette, positions it to align the foremost film unit therein at the image surface of the camera, and advances each film unit for transport to the processor. The processor is aligned to receive each film unit advanced out of the receptacle, and subjects it to the critical operations that assure proper photographic development. The film-engaging mechanism thus brings together, in a single, readily-mounted assembly, the camera structure necessary for engaging a self-developing film unit in a camera to ensure proper photographic treatment, but leaves the design, construction and fabrication of the camera otherwise free of the film-engaging requirements.

16 Claims, 5 Drawing Figures

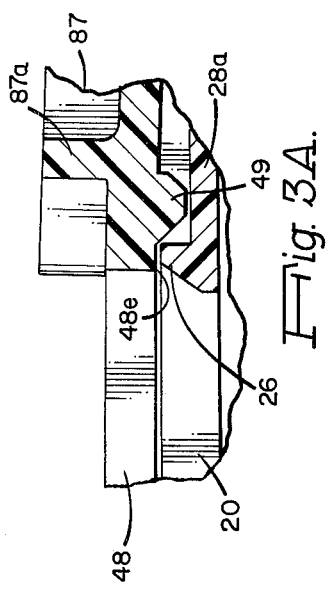
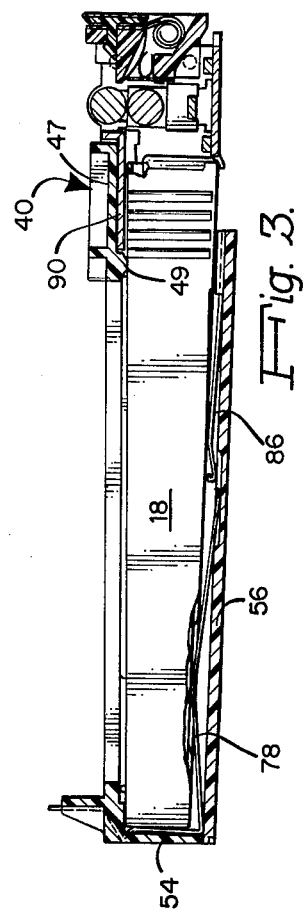
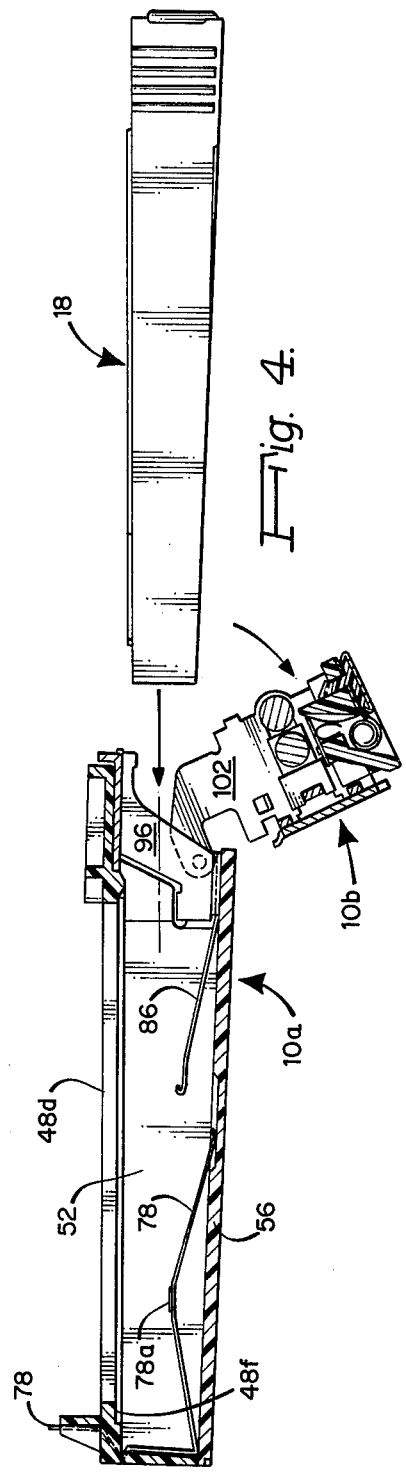

FILM-ENGAGING PHOTOGRAPHIC MECHANISM FOR SELF-DEVELOPING FILM

BACKGROUND

This invention relates to a mechansim for incorporation in a photographic camera for handling self-developing photographic film and for processing it after exposure. The mechanism provides all the film-engaging structure for a camera of the self-developing type, but leaves other elements of the camera free for design independent of film-engaging requirements. The invention also provides a receptacle unit for such a film-engaging mechanism.

The invention enables persons not skilled in the handling and processing of self-developing film to configure cameras in many varied ways and, by incorporating the mechanism of the invention, consistently to obtain high quality photographs.

The processing of self-developing film, to transform the latent image impressed thereon by exposure to a permanent visible image, is a complex process which requires the precise control of many parameters. Consider for example the processing of self-developing film of the type available from the Polaroid Corporation in Cambridge, Mass. for use in that company's cameras sold under the registered designations SX-70 and PRONTU! This film is in the form of separate card-like film units, each of which has a multi-layer construction with an opaque back and a photo-sensitive front and which carries along one margin a set of rupturable pods containing fluid photoprocessing composition. After exposure, the film unit is advanced through a slot in the film-storing cassette to transport it from the cassette to the nip between a pair of spread rollers. The spread rollers rupture the pods and spread the photoprocessing composition between layers of the film unit across the entire photosensitive surface.

Successful processing of each film unit in this manner depends on numerous factors, including the shape of each roller and the force between them, the physical constraints on the film unit as it exits the cassette slot and spans the space from there to the roller nip, the configuration of the film unit during engagement with the rollers and thereafter, and the masking of light from the film unit for a brief interval after passage through the rollers. These and related factors typically are carefully controlled, with structure that are dimensioned with tolerances measured in terms of ten-thousandths of an inch, i.e. 0.0001 inch.

The manufacture of self-developing cameras is more likely to become available to numerous firms provided each film producer is assured that cameras of others process the film correctly. This is necessary to ensure customer satisfaction with the film and thereby preserve the reputation of the film producer. However, it is likely to be excessively costly for each camera manufacturer to develop its own expertise to provide a film handling and processing mechanism that meets the exact requirements noted above.

Therefore, it is an object of this invention to provide a separable camera mechanism for providing all film-engaging operations for a self-developing camera, and which imposes minimal restraint on other functions and aspects of the camera.

A further object of the invention is to provide a mechanism of the above character suited for incorporation in cameras of varied design and configuration. It is also an object to provide a mechanism of the above type which is relatively low in manufacturing cost, and which is compact in size.

Thus it is an object of the invention to provide a mechanism for incorporation in cameras designed by others which a film supplier can provide to assure that its self-developing film is handled and processed in the exacting manner required for reliable top quality performance.

It is also an object of the invention to provide a unitary receptacle for a film-engaging mechanism of the above type and which provides at least the film storage, positioning, and initial transport operations for a self-developing camera, and which configures and constrains the film for proper feed into the processing press rollers.

Other objects of the invention will in part be obvious and will in part appear hereinafter.

SUMMARY OF THE INVENTION

The invention attains the foregoing and further objectives by providing a unitary mechanism which can be incorporated in a self-developing camera to provide the operations which involve engaging the film, including the film-housing cassette. The mechanism has two major portions, a receptacle and a processor. The receptacle includes a compartment of unitary construction that receives and positions the replaceable film cassette. The receptacle mounts the film-advancing pick which indexes a film unit out of the cassette and feeds it to the processor, and includes a stiff plate member which bears against the advancing film unit to constrain and configure it for proper processing. Further structure of the receptacle hingedly mounts the processor for proper alignment with the advancing film unit and, alternatively, for selective displacement to allow replacement of a film cassette. The receptacle also can mount, without modification, electrical contacts for connection to a battery in the film cassette, and a separate, spring-carrying bottom cover for the compartment.

The processor provides the now-conventional pair of spread rollers that form a film-engaging nip, the film-deflecting spread bar, and the retractable shade that covers a film unit as it emerges from the spread rollers.

The invention accordingly provides a film handling and processing mechanism which a camera manufacturer can purchase as a unit, typically from a film producer, and incorporate in the manufacturer's own camera. The mechanism provides all the film storage, positioning, transport, processing, and other handling in the camera. The film superior accordingly is assured that a camera which uses the mechanism will properly process the film. On the other hand, the mechanism leaves the camera manufacturer essentially free of film-engaging constraints in the design and construction of other aspects of the camera, such as the overall design and style, the optical system, and the shutter and exposure control elements. Also, the relatively few interconnections of the film-engaging mechanism with other parts of the camera are convenient to provide. The mechanism is accordingly readily incorporated in a camera, operates in different orientations, and is relatively compact and low in cost.

Many functions which a film handling and processing mechanism embodying the invention provides are present in current self-developing cameras, including those identified above, and are disclosed in numerous earlierfiled patents and patent applications, including among others the commonly-assigned application Ser. No. 554,779 of B. K. Johnson et al. filed Mar. 3, 1975 for "Photographic Apparatus Having Film Container Locating Structure", now U.S. Pat. No. 3,976,083. Further, patent application Ser. No. 628,486 filed Nov. 4, 1975 of Rolf M. Augustin, Jr. et al. for "Camera Back Apparatus", now U.S. Pat. No. 4,023,191, and assigned to the assignee hereof, discloses a camera back for self-developing film for attachment to a camera front body. However, it is considered that the art does not include a separate mechanism for incorporation in a camera to provide all the handling and processing of the self-developing film, but yet which imposes essentially minimal constraints or requirements on the other aspects and features of the camera.

The invention accordingly comprises the features of construction, combination of elements, and arrangement of parts; and includes an article of manufacture having the features, properties, structure, and relation of elements; all as exemplified in the embodiments hereinafter set forth, and the scope of the invention is indicated in the claims.

BRIEF DESCRIPTION OF THE DRAWINGS

For a fuller understanding of the nature and objects of the invention, reference should be made to the following detailed description and the accompanying drawings, in which

FIG. 3 is a transverse cross-sectional view of the film-engaging unit of FIG. 2, taken along line 3—3 of FIG. 1, with a film cassette nested therein;

FIG. 3A is an enlarged fragmentary portion of FIG. 3; and

FIG. 4 is a transverse cross-sectional view similar to FIG. 3 illustrating the loading and unloading of the film cassette.

DESCRIPTION OF ILLUSTRATED EMBODIMENT

Figure 1:
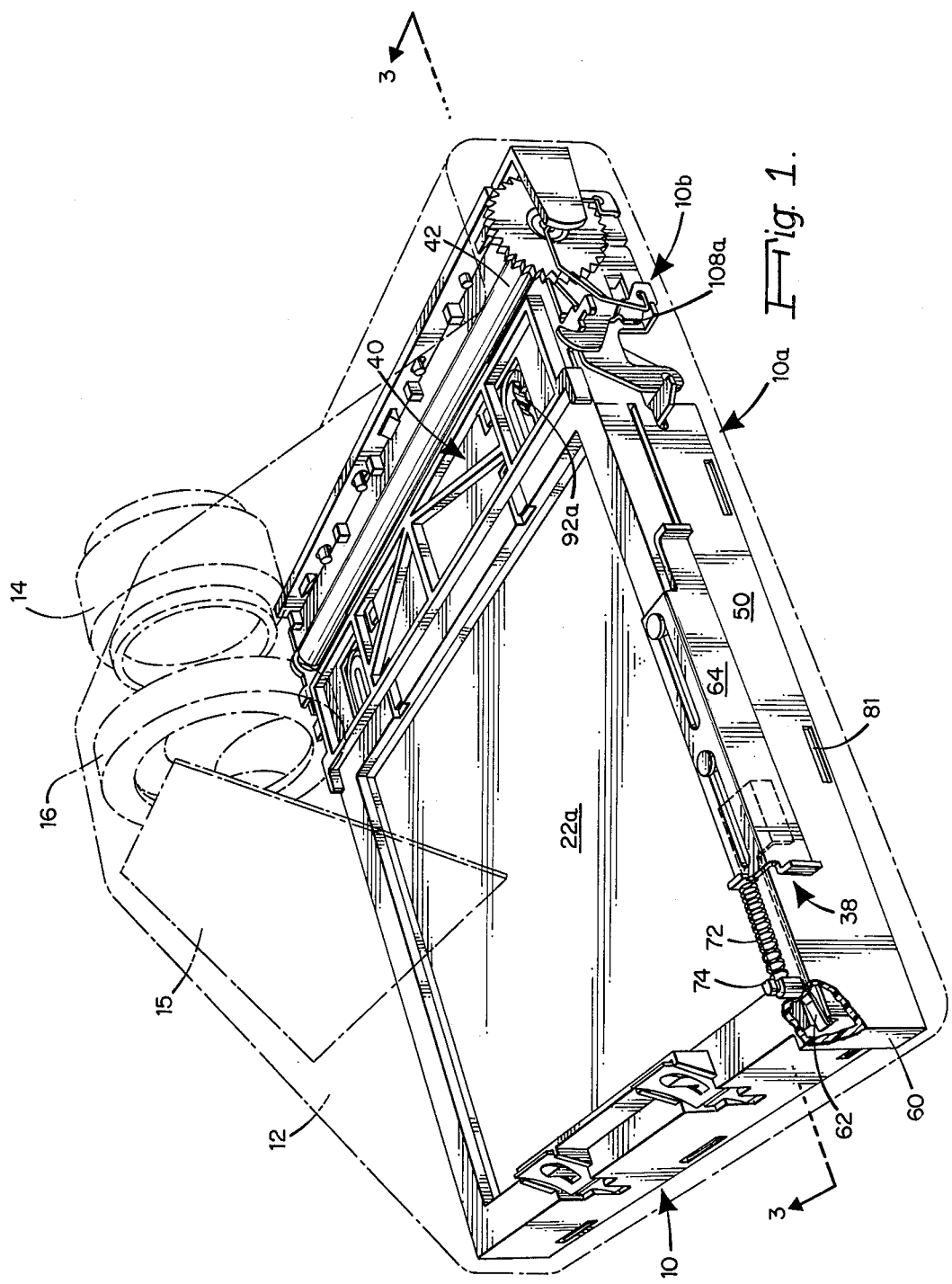
FIG. 1 is a schematic representation of a self-developing camera incorporating a film-engaging mechanism according to the invention.

A self-developing camera as shown in FIG. 1 incorporates a film-engaging mechanism 10 according to the invention within a camera housing 12. The mechanism 10 provides all the functions and operations which involve engagement with the self-developing film, including storage and positioning, transport, and processing. On the other hand, the mechanism 10 imposes minimal constraints on the housing, as well as on other elements of the camera such as the optical system illustrated as having a lens system 14 and a mirror 15, and the shutter and exposure control elements schematically designated at 16. Accordingly, the camera design can to a large extent be independent of the mechanism 10 and of the exacting requirements for proper engagement of the self-developing film. Correspondingly, the same film-engaging mechanism 10 can be used in cameras of different designs, constructions and styles.

Figure 2:
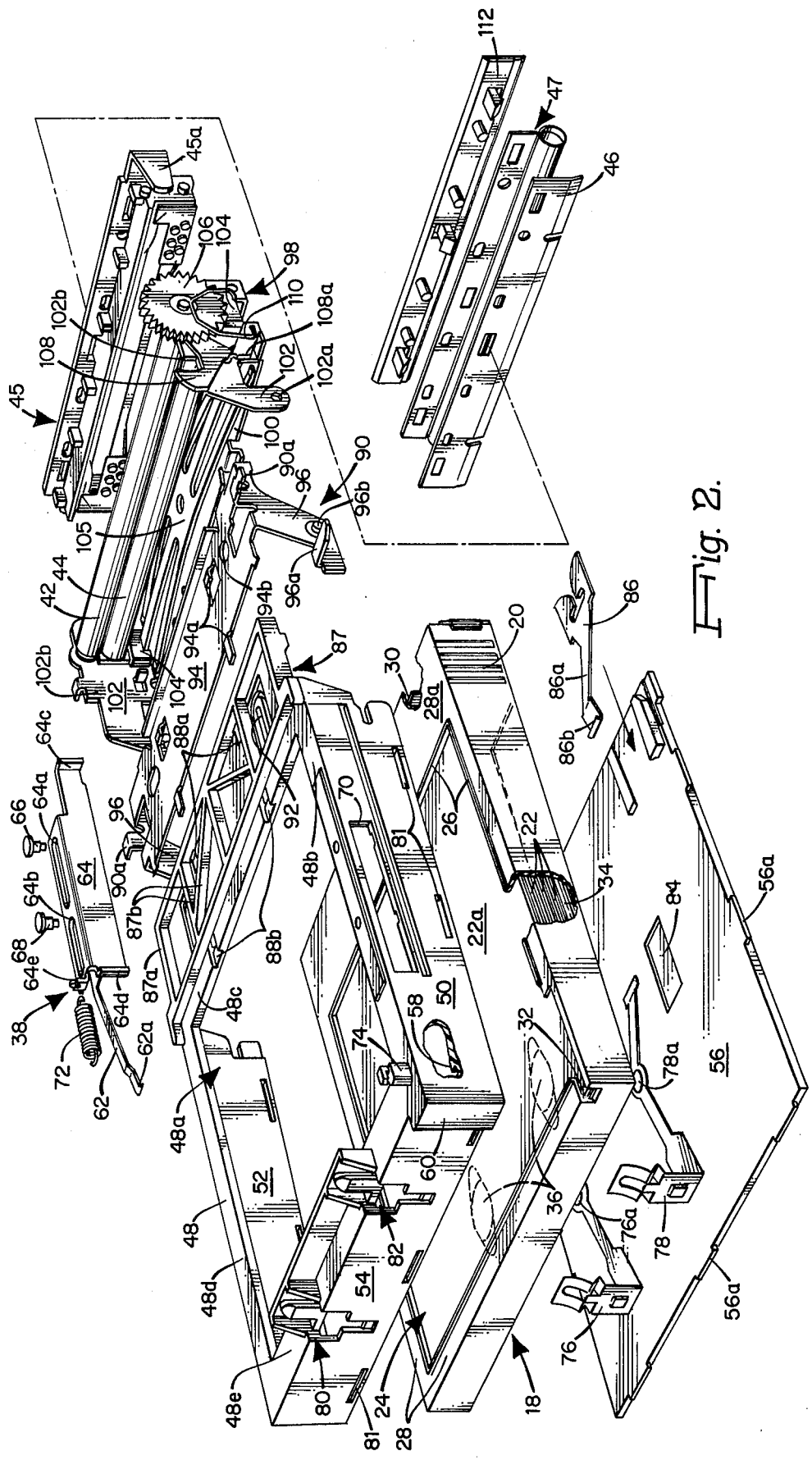
FIG. 2 is an explosed view of a film-engaging mechanism as shown in FIG. 1, with a film cassette.

The illustrated film-engaging mechanism 10 is for use with a film assemblage in the form of a cassette which houses a stack of separate card-like film units. This type of film cassette is commercially available from Polaroid Corporation in Cambridge, Mass. for use in cameras sold under the registered designations SX-70 and PRONTO!, and is described in U.S. Pat. No. 3,651,746 of E. H. Land entitled "Film Assemblage". The film units in the cassette, disclosed in U.S. Pat. No. 3,415,644 of E. H. Land for "Novel Photographic Products And The Processes", are stacked with a foremost one available for photographic exposure through an exposure window. More particularly, as FIG. 2 shows, the invention is illustrated as operating with a commercially-available film cassette 18 which has a casing 20 that contains a stack of several thin, flexible, individual film units 22 of the self-developing type. The casing has an essentially rectangular configuration of front, back and side walls and the top wall is open to form an exposure window 24 bounded by an upstanding peripheral lip 26 within a peripheral flange 28. The pod of photoprocessing composition of each film unit is located at the front end of the cassette, under the wide flange section 28a. A leaf spring in the casing biases the film units toward the casing top so that the foremost film unit 22a is at the exposure window and hence at the image surface of the camera. The cassette has a frontal exit slot 30, through which the foremost film unit can slide but which is normally optically shielded by a pliable flap. Extending forward from the casing back wall along one side of the cassette is an opening 32 which provides access for a film-advancing pick arm to engage the back marginal edge of the foremost film unit within the cassette, to advance it through the exit slot 30.

The illustrated film cassette 18 also includes a battery 34 for powering such elements of the camera as a film-advancing motor and the exposure control elements. The battery typically is disposed inside the casing 20 on the side opposite the exposure window 24, and accordingly is nested between the leaf spring and the casing back wall. The battery has terminals 36 which are accessible through openings in the casing bottom wall.

With further reference to FIGS. 1 and 2, the film-engaging mechanism 10 has a film receptable 10a and a film processor 10a. The receptacle receives the replaceable film cassette 18 and positions it so that the foremost film unit 22a therein is located at the camera image surface for proper focus and exposure. The receptacle also mounts a slidable pick device 38 which an actuator (not shown) in the camera moves in order to advance an exposed film unit from the film cassette to the processor 10b. A plate member 40 on the front end of the receptacle constrains, and preferably depresses, the wide frontal flange portion 28a of the cassette 18, in the manner disclosed in U.S. Pat. No. 3,820,137 of J. J. Driscoll for "Photographic Apparatus".

The processor 10b of the film-engaging unit includes two spread rollers 42, 44 which rupture the film-unit pods and spread the photoprocessing composition. A spreader bar 45 and a deflector blade 46 on the processor configure and deflect the film unit during and after engagement with the spread rollers, and a retractable shade 47 shields the film unit from light during and immediately after processing by the spread rollers.

More particularly, with reference to FIGS. 1, 2, and 3, the receptacle of the film-engaging unit 10 has a unitary compartment-forming structure with a planar top wall 48 joined to two peripheral side walls 50, 52 and to a peripheral back wall 54, which is also joined to the side walls. The top wall 48 is open with a large central aperture 48a to expose the entire window 24 of a film cassette 18 disposed in the receptacle 10a. Thus the top wall has four wall members 48b, 48c, 48d and 48e which bound the aperture 48a.

The bottom and the front of the receptacle 10a are open, although an optional bottom panel 56 can be provided. Alternative to the use of the bottom panel 56, the camera housing 12 or a like panel member can be provided in the camera to span at least part of the opening below the receptacle top all 48.

The compartment which the receptacle top, side and back walls thus form is dimensioned to receive a film cassette 18 at the receptacle front end as FIG. 4 shows, and to seat the cassette therein as in FIG. 3, positioned by the inner surfaces of the receptacle walls. That is, a cassette is inserted into the receptacle at the open front, with the processor 10b hingedly moved away as shown in FIG. 4, by introducing it under the plate member 40 and between the side walls 50 and 52. The cassette is slidable under the top wall 48 and between the side walls until it abuts the back wall 54. When fully inserted into the receptacle, the cassette is nested between the side walls and sits flat against the upper wall 48.

The receptacle top wall 48 is dimensioned to overlie the upstanding lip 26 of the film cassette 18 around the full periphery of the aperture 48a. Further, the inner edge of the top wall aperture preferably is substantially in register with the inner edge of the window 24 of a cassette seated in the receptacle. However, as FIG. 3 (including the detailed view of FIG. 3A) shows, the receptacle top wall has a relief 48f around the full periphery of the aperture 48a to receive the cassette lip 26 without interference. The top wall thus abuttingly engages, and thereby positions, the cassette along the cassette flange 28, rather than at the lip 26. Further, the lowermost part of front member 48c, of the receptacle top wall, is a relatively narrow rail portion 49. The rail portion is adjacent the relief 48f and has bevelled, camming sides. With this configuration, the receptacle front wall bears against the cassette flange 28 with the underside of the rail portion. In addition, the rail portion 49 preferably engages the frontal section of the cassette lip 26 with slight interference to provide a "snap-action" like entry of the cassette into the receptacle. This interference tends to retain the cassette fully seated in the receptacle, i.e. as limited by the back wall, and secure against inadvertent dislodgment, especially whenever the processor 10b is in the open position of FIG. 4. However, the bevelled sides of the rail portion provide a camming action against the cassette lip to facilitate passage of the lip thereunder upon insertion, or removal, of a cassette.

The unitary compartment-forming structure of the illustrated receptacle 10a further has two features which concern the indexing, by means of the pick device 38, of a foremost film unit out of a cassette seated in the receptacle. One such feature is a boss 58, shown for clarity enlarged out of scale in FIG. 2, projecting into the compartment from the inner surface of the wall 50 adjacent but closely spaced from the back wall 54. The boss has a ramp-like configuration, with maximum height at its back-most end in the receptacle, such that it has a triangular cross-section in a plane parallell to the top wall 48.

The boss 58 engagingly bears against the film cassette 18 to minimize rotational displacement of the cassette within the receptacle when the pick device 38 is drivingly engaged behind a film unit to advance it out of the cassette. The other structural feature is an enlargement 60 in the back wall 54 adjacent the corner with the side wall 50, and formed by stepping the back wall 54 outward, as shown in FIGS. 1 and 2. The enlargement 60 provides access space for the end of the pick device 38, described below, to ensure that the pick arm thereof can extend behind the foremost film unit 22a, even when the cassette is in abutment with the back wall 54 so that there is no clearance space between them.

As also shown in FIG. 2, the pick device 38 has a pick arm 62 which fits within the receptacle 10a under the top wall member 48b to engage the hoe-like end 62a thereof into the cassette access opening 36 and behind the back edge of the foremost film unit 22a in the cassette. Forward sliding movement of the arm draws that film unit forward, out of the cassette exit slot 30 and into the nip between the rollers 42, 44 of the processor 10b. U.S. Pat. No. 3,753,392 of E. H. Land for "Film-Advancing Apparatus" describes one preferred construction for the pick arm 62, and the operation of it.

The pick device 38 has a slide carriage 64 which carries the pick arm 62 for the foregoing movement relative to the receptacle and correspondingly relative to a film cassette 20 nested therein. The illustrated carriage is an elongated plate with two longitudinal slots 64a, 64b and upturned tabs 64c, 64d. These tabs drivingly engage with a pick actuator (not shown) in the camera of FIG. 1 to drive the carriage foward and, if desired, control its back motion to te position of FIG. 1. The carriage is mounted on the outside of the receptacle 10a by way of headed pins 66 and 68, seated in the receptacle wall, which pass through the slots 64a, 64b respectively to allow the slide to move along the front-to-back direction of the receptacle. The pick arm 62 passes through a slot 70 through the receptacle side wall 50 to join to the carriage. The carriage preferably overlies the slot 70 to cover it and thereby reduce the likelihood of the light leakage into the interior of the receptacle 10a.

As further shown in FIG. 2, the illustrated carriage 64 is longitudinally folded to dispose the drive tabs 64c and 64b and the mounting attachment to the pick arm 62 along the side wall 50, and to dispose the slots 64a and 64b over the top wall 48, to which the pins 66 and 68 are secured. This construction is preferred to maximize the accessibility of the tab ends 64c and 64d to whatever pick actutor the camera of FIG. 1 employs. It also allows a spring 72 which biases the pick carriage in the back position of FIG. 1 to operate in alignment with the slotted mounting of the carriage on the receptacle. The spring 72 is tensioned between a further tab 64e protruding from the slide carriage at its back end and a spring mount 74 which protudes above the top panel 48 adjacent the corner of the receptacle walls 50 and 54.

The foregoing incorporation of the pick device 38 on the receptacle of the film-engaging mechanism 10 assures the requisite proper positioning of the pick arm relative to the foremost film unit in a film cassette seated in the receptacle. This positioning is desirable for reliable, jam-free advancement of film units from the film cassette by means of the pick device.

To ensure that the connections of the camera to the battery in the cassette to not disturb the positioning of the cassette within the receptacle, as could result from camera contacts which are misplaced relative to the cassette-housing receptacle, the film-engaging receptacle 10a of the invention preferably also mmounts two contacts 76 and 78 that electrically engage the battery terminals 36. Each contact has, as shown in FIG. 2, an overall L-shape with a base portion and a resilient leg portion. The base portion forms the mounting structure for the contact, and the leg portion has a contact pad 76a, 78a approximately mid-way along the length thereof. The receptacle 10a carries contact mounts 80, 82 along the back wall 54 for replaceably mounting the contacts 76, 78 with the base portion of each disposed along the back side of the receptacle compartment out of the way of a film cassette 18 and the leg portion resiliently bowing into the chamber from below, as in FIG. 4. External electrical connections (not shown) can electrically engage the mounted contacts from outside the receptacle. Upon insertion of a film cassette 18 into the receptacle 10a, the cassette cams against the leg portion of each contact and deflects that portion underneath the cassette. When the cassette is fully seated in the receptacle, the contact pads 76a, 78a engage the battery terminals 36, 36 as FIG. 3 shows. The contacts 76, 78 are optional, for they are selectively removable from their mounts 80, 82 to allow the receptacle 10a to be used without them in a camera that provides other connections to the cassette battery 34.

The optional bottom cover 56 for the film-engaging receptacle 10a can, as FIG. 2 shows, simply be a flat panel with laterally projecting tabs 56a that snap fit into mating apertures 81 in the receptacle walls 50, 52 and 54. The illustrated panel is recessed with shallow depressions 84, 84, each located to receive the free end of one of contacts 76, 78. The depressions guide the sliding movement of the contact free ends when a film cassette is loaded into, and removed from, the receptacle 10a and hence aid in maintaining the contacts properly located.

The illustrated bottom cover 56 also carries, forward of the depressions 84, a pair of spring members 86, 86. Each spring member has a sloping cam section 86a leading to an upturned hook-like end 86b at the free end. As known from prior camera structures where similar spring members are used, when a film cassette 18 is inserted into the receptacle 10a with the proper orientation, it cams the spring members 86 away to pass over them. When the film cassette is fully seated, the spring members resiliently urge it against the top wall 48 of the receptacle 10a. Another function of the spring members 86 is to prevent the insertion of a film cassette into the receptacle 10a with improper orientation, for in that case the hook ends 86b catch a forward edge of the improperly oriented film cassette and prevents further insertion into the receptacle 10a.

Alternative to using a bottom cover 56 as shown in FIG. 2, the camera of FIG. 1 can have a housing section or another member located below the film-engaging receptacle 10a to provide, where desired, similar supportive engagement with battery contacts 76, 78 and/or cassette-engaging spring elements like the illustrated elements 86.

With further reference to FIG. 2, the plate member 40 is formed of two parts, one of which is an outer plate 87 formed integrally with the unitary structure of the receptacle compartment as a forward-projecting, overhanging extension of the top wall 48. The plate spans the entire width of the receptacle between the side walls 50 and 52, and has both continuous peripheral ribbing 87a and cross-ribbing 87b to strengthen it against deflection transverse to the plane of the top wall 48. The inner surface of the plate, opposite from the ribbed side, is flat except for mounting and positioning surfaces noted below.

For connection to a hanger bracket 90 that forms the other part of the plate member 40, the outer plate 87 has two tab-receiving openings 88a, 88a, and two further tab receiving openings 88b, 88b are at the juncture of the plate with the wall front member 48c. Further, two resilient tabs 92, 92 are formed in the outer plate, each carrying a stud 92a which projects from the plate inner surface. The outer plate also can have bracket-positioning shoulders projecting from its inner surface.

The hanger bracket 90 fits under the outer plate 47 and has a central web portion 94 which spans across the full width of the receptacle to dispose downward-projecting end legs 96, 96 thereof aligned with the receptacle side walls 50, 52 respectively. The bracket web portion has upstanding and laterally-extending tabs 94a which engage in the openings 88a and 88b, and has holes 94b into which the resiliently-mounted studs 92a snap-fit. Further, each leg of the bracket has an outwardly-protruding tab 96a which seats in a slot recessing the forward end of each receptacle side wall 50, 52.

This multi-point interconnection securely joins the hanger bracket 90 to tthe outer plate member 87 and hence to the cassette-positioning walls 48, 50, 52 and 54. Further, the bracket combines with the outer plate to provide a deflection-resistant beam-like plate member 40 extending over the exit slot 30 of a cassette 18 seated in the receptacle 10a. Accordingly, the plate member limits the width of the exit slot during discharge of a film unit, as desired for proper processing of the film unit through the spread rollers 42, 44.

The foregoing film-engaging receptacle 10a, which stores and positions a replaceable film cassette, indexes an exposed film unit out of the cassette slot for transport to the film processor, and selectively deflects the cassette adjacent the exit slot, preferably has the unitary compartment structure molded of synthetic plastic material. As FIG. 2 shows, the preferred molded fabrication forms all the structure of the receptacle, except the hanger bracket 90, the pick device 38, the contacts 76, 78 and the bottom panel 56. The molded compartment-forming structure, which readily assembles with these separate parts, can have both the rigidity and the close dimensional tolerances desired for proper engagement with self-developing film units.

The hanger bracket 90 preferably is made of metal sheet which is coined to form a minor cassette-deflecting projection on the inner surface of the web portion 94, in the manner disclosed in the above-noted U.S. Pat. No. 3,820,137. Further, each leg 96 of the bracket carries an outwardly-projecting pin 96b which hingedly mounts the processor 10b of the film-engaging mechanism.

The illustrated processor 10b is structured similar to corresponding elements in the PRONTO! camera noted above and as detailed in U.S. Pat. No. 3,974,510 of A. S. Ivester and in the pending commonly-assigned patent application Ser. No. 648,632 of Andrew S. Ivester and Bruce K. Johnson for "Fluid Spreading Apparatus", now abandoned, the disclosure of which is incorporated herein by reference. Accordingly, the processor 10b includes, as shown in FIG. 2, a U-shaped frame 98 having a base 100 and upstanding sides 102, 102. The top roller 42 mounts to the frame sides with plastic bearings. The lower roller 44 mounts to the frame sides by way of bearing blocks 104, 104 that fix the minimal spacing between the two rollers, and a leaf-type spring 106 seats on the frame base 100 to urge the bearing blocks tto maintain this inter-roller spacing. To drive the rollers, the roller 42 carries a gear 106 which is located outboard of one frame side 102 for access to engage whatever drive element the camera of FIG. 1 employs.

The processor 10b is hingedly mounted to the receptacle 10a by engagement of the hanger bracket pins 96b in pivot holes 102a in each side of the frame 98. A latch plate 108 is pivotally mounted outside one frame side 102 releasably to engage one of two outwardly-projecting hanger bracket tabs 90a, 90a. A wire spring 110 biases the latch plate 108 into the latching position shown in FIG. 2. A shoulder 108a on the plate is accessible to rotate it counterclockwise, against the bias of spring 110, to release the latch plate from the hanger bracket tab 90a. Each hanger bracket tab 90a abuts a shoulder 102b on each frame side to fix the rotational position of the processor relative to the receptacle when the two elements are latched together, FIG. 3.

In this position, the roller nip is aligned in the path of a film unit which the pick device 38 advances out of a film cassette. Accordingly, the advancing film unit feeds into the roller nip, and is advanced further by the driven rotation of the top roller 42.

When the latch plate 108 is disengaged from the backet tab 90a, the processor is free to rotate clockwise from the position of FIG. 3 to the position of FIG. 4. Here the processor is displaced away from the front of the receptacle 10a and is out of the path of a film cassette being loaded into or removed from the receptacle.

As noted above, the film-engaging processor 10b also includes a spreader bar 45, a film-deflecting blade 46, and a film-shielding optical shade 47. A snap-fitting mounting bar 112, FIG. 2, secures the blade and the shade to the spreader bar 45. The spreader bar, in turn, snap fits onto the processor frame 98, suitably nested between the frame legs 102 and secured therein with projecting lugs received in mating apertures. A spring-retaining arm 45a on the bar, however, projects forward and around the frame 98, as shown in FIGS. 1 and 2, to constrain the wire spring 110 in place. The commonly-assigned application of Harvey S. Friedman for "Film Unit Deflection System For Self-Developing Camera" filed on even date herewith, Ser. No. 721,992, (the disclosure of which is incorporated herein by reference) and the prior patent documents noted therein, discloses the further structure and functioning of the spreader bar 45, the blade 46 and and the shade 47.

The receptacle 10a and the processor 10b as described above thus form a highly compact mechanism which provides all the film-engaging functions for a self-developing camera. The two sub-assemblies can readily be separated, as for servicing of the processor, but operate together with secure reliability. The mechanism can be mounted in a camera with numerous fastenings, including without limitation clamps that secure the receptacle in place and lugs or like projections formed on the outside of the receptacle side and/or back walls. Moreover, the receptacle of the mechanism provides a new and compact unitary structure which provides many film-engaging functions for self-developing photographic equipment.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative and not in a limiting sense. Also, note should be made that the commonly-assigned patent application of William P. Lane for "Film-Engaging Mechanism And Transport Receptacle Therefor" filed on even date herewith, Ser. No. 721,856, discloses another film-engaging mechanism of the type described herein.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Apparatus for engaging self-developing photographic film, in the form of cassette-housed separate card-like film units, in a camera; said apparatus receiving a replaceable film cassette and positioning it with a foremost film unit therein located for photographic exposure, and advancing the foremost film unit from the cassette for processing with fluidic photoprocessing composition carried with the film unit, said apparatus having i. a receptacle for replaceably receiving at a front end thereof a cassette containing such card-like film units stacked under an exposure window, said cassette having a frontal exit slot and an access opening thorugh which the foremost film unit can be engaged for advancing it through the exit slot for discharge from the cassette, and ii. a processor of self-developing film units, said processor being hingedly mounted to the receptacle adjacent the front thereof for hinging movement between a first position where the processor is at the front of the receptacle in alignment to receive a film unit being advanced out of a receptacle-seated cassette, and a second position where the processor is removed clear of the path of a cassette being loaded into and alternatively being removed from the receptacle, said apparatus being characterized in that said receptacle and said processor constitute a complete mechanism adapted for mounting as a unit in a camera for receiving and selectively positioning such a film cassette, and for engaging such self-developing film units within the cassette and for processing such film units, and further imposing minimal requirements and restraints on non-film engaging elements of the camera, and comprising A. a unitary receptacle structure having a laterally-extending top wall and laterally-extending first and second side walls and transversely-extending back wall means, said side walls and back wall means being arranged to positioningly engage side and back walls of such a film cassette received in the receptacle and said top wall having an aperture located to be in register with the exposure window of such a cassette, B. an opening in at least one laterally-extending wall of said receptacle, C. a carriage movably mounted on the outside of the receptacle and having means for driving engagement therewith, D. pick arm means mountingly secured to said carriage and extending through said opening to within said receptacle for engagement with the back edge of a foremost film unit in a receptacle-seated cassette, and movable with said carriage for advancing such a film unit frontward and out of the cassette exit slot, E. means forming a plate member spanning between said receptacle side walls and overlying a receptacle-seated cassette above and closely adjacent the exit slot thereof, said plate member including structural elements for resisting deflection outward from within said receptacle, and F. means for hingedly mounting said processor to said receptacle adjacent the front thereof with hinge action which alternatively disposes the processor in said first position and in said second position.

2. Film-engaging apparatus according to claim 1 further comprising first and second releasably engageable latch means mounted one on said receptacle and the other on said processor, and selectively engageable for releasably holding said processor in said first position relative to said receptacle.

3. Film-engaging apparatus according to claim 1 in which said means forming said plate member comprises at least a portion of said top wall.

4. Film-engaging apparatus according to claim 1 in which said receptacle structure consists of a unitary molded receptacle unit forming said top wall, said side walls, and said back wall means.

5. Film-engaging apparatus according to claim 4 wherein said plate member comprises a first plate element molded integrally with said receptacle walls and wall means, and a second plate element mechanically secured thereto.

6. Film-engaging apparatus according to claim 5 wherein said second plate element comprises a metal bracket spanning between said side walls and carrying metal hinge members for said hinged mounting of said processor to said receptacle.

7. Film-engaging apparatus according to claim 1 further comprising
A. first and second electrical contacts, and
B. first and second contact mounts on the outside of said receptacle for removably mounting said electrical contacts for extension within said receptacle spaced below the receptacle top wall for engagement with terminals accessible on the side of a receptacle-seated film cassette opposite the cassette exposure window.

8. Film-engaging apparatus according to claim 1 further comprising a removable bottom cover for said receptacle, said bottom cover being a panel-like member spanning between said side walls and having means for removable connection thereof with said side walls.

9. Film-engaging apparatus according to claim 1 wherein said back wall means comprises a receptacle back wall extending between said side walls and forming with said side walls an open-fronted three-sided positioning support for such a film cassette.

10. Film-engaging apparatus according to claim 9 in which said unitary receptacle structure further comprises an enlargement recessing said back wall outward for accommodatingly receiving within the receptacle said pick arm behind a film unit in a receptacle-seated cassette.

11. Film-engaging apparatus according to claim 9 further comprising a removable bottom cover for said receptacle, said bottom cover being a panel-like member spanning between said side walls and extending from below said plate member to said back wall and having fastening means for mounting connection thereof with said back and side walls.

12. Film-engaging apparatus according to claim 1 wherein said top wall comprises A. an aperture-bordering peripheral section arranged to overlie, without engaging, the window-forming periphery of a receptacle-seated cassette, and
B. an inner section extending laterally outward from said peripheral section and having on the inside surface thereof cassette-positioning means for positionally abutting cassette surfaces spaced outwardly from the periphery of the exposure window thereof.

13. A film-engaging transport receptacle for engaging self-developing photographic film, in the form of cassette-housed separate card-like film units, in a camera; said receptacle removably receiving at a front end thereof a replaceable film cassette containing card-like film units stacked under an exposure window, said cassette having a frontal exit slot and an access opening through which the foremost film unit can be engaged for advancing it through the exit slot for discharge from the cassette, said receptacle positioning such a cassette received therein with a foremost film unit thereof located for photographic exposure, and advancing the foremost film unit from the cassette for processing with fluidic photoprocessing composition carried with the film unit, said receptacle being characterized in that it constitutes a complete mechanism adapted for mounting as a unit in a camera for receiving and selectively positioning such a film cassette, and for engaging such self-developing film units within the cassette and for advancing each such film unit out of the cassette, and further imposing minimal requirements and restraints on non-film engaging elements of the camera, and comprising A. a unitary receptacle structure having a laterally-extending top wall and laterally-extending first and second side walls and transversely-extending back wall means, said side walls and back wall means being arranged to positioningly engage side and back walls of such a film cassette received in the receptacle and said top wall having an aperture located to be in register with the exposure window of such a cassette,
B. an opening in at least one laterally-extending wall of said receptacle,
C. a carriage movably mounted on the outside of the receptacle and having means for driving engagement therewith,
D. pick arm means mountingly secured to said carriage and extending through said opening to within said receptacle for engagement with the back edge of a foremost film unit in a receptacle-seated cassette, and movable with said carriage for advancing such a film unit frontward and out of the cassette exit slot,
E. means forming a plate member spanning between said receptacle side walls and overlying a receptacle-seated cassette above and closely adjacent the exit slot thereof, said plate member including structural elements for resisting deflection outward from within said compartment, and
F. means for mounting a processor of such film units to the receptacle for selective disposition adjacent the receptacle front in alignment to receive a film unit being advanced out of a receptacle-seated cassette.

14. A photographic receptacle for incorporation in a camera for cassette-housed separate card-like self-developing film units, said receptacle having front and back ends and receiving at a front end thereof a replaceable cassette containing card-like self-developing film units stacked under an exposure window, the cassette having a frontal exit slot and an access opening through which at foremost film unit therein can be engaged for advancing it through the exit slot for discharge from the cassette, said receptacle positioning the cassette received therein with the foremost film unit located for photographic exposure through the cassette exposure window, and advancing the foremost film unit from the cassette for processing with fluidic photoprocessing composition carried with the film unit, said receptacle comprising A. a one-piece molded unit having a laterally-extending top wall, laterally-extending first and second side walls, and a transversely-extending back wall and forming an open-fronted cassette-receiving compartment, said side and back walls extending along the sides and back of said top wall and being arranged to positioningly engage side and back walls of such a film cassette received in the receptacle and said top wall abuttingly positioning top surfaces of a receptacle-seated cassette and having an aperture located to be in register with the exposure window of such a cassette, B. means forming a slot in at least one laterally-extending wall extending along the direction between said front and back receptacle ends, C. a slide carriage mounted on said receptacle outside said compartment and slidable along the front-to-back direction and including means for driving engagement therewith for moving said slide carriage at least in the direction toward said front end, D. pick arm means mountingly secured to said carriage and extending through said slot to within said compartment for engaging, through the cassette access opening, the back edge of a foremost film unit in a receptacle-seated cassette, E. spring means mounted on said receptacle for biasing said carriage to an extreme back position where said carriage disposes said pick arm means behind the back edge of a cassette-housed foremost film unit, and F. means, including said receptacle top wall, forming a plate member along the top wall of said receptacle, said plate member spanning between said receptacle side walls and overlying a receptacle seated cassette above and closely adjacent the exit slot thereof and having stiffening means such that said plate member resists deflection outward from within said compartment, said means further including a metal hanger bracket secured to said receptacle top wall and spanning with said top wall and in contiguous abuttment therewith between said side walls, said bracket mounting hinge elements for engagement with a processor of such self-developing film and for mounting such a processor to the receptacle adjacent the front thereof for hinged movement between a first position where the processor is at the front of the receptacle in alignment to receive a film unit being advanced out of a receptacle-seated cassette, and a second position where the processor is removed clear of the path of a cassette being loaded into and alternatively being removed from the receptacle.

15. A receptacle according to claim 14 further comprising means in said molded unit forming an enlargement of said compartment extending back outward of the cassette-positioning portion of said back wall for accommodatingly receiving said pick element behind a film unit in a receptacle-seated cassette when said slide carriage is moved to the extreme back position thereof.

16. A receptacle according to claim 14
A. wherein said slot and said slide carriage are located along one side of said compartment, and
B. further comprising a side wall inner surface along the compartment side where said slot and slide carriage are located formed with boss means projecting into said compartment beyond the remainder of said surface for engagement with the side wall of a receptacle-seated cassette and for fixing the cassette position during engagement of said pick arm with a receptacle-housed film unit.

* * * * *